United States Patent Office 3,290,226
Patented Dec. 6, 1966

3,290,226
MICROBIOLOGICAL CONVERSION OF UNSATURATED FATTY ACIDS
Philip F. Beal III, Kalamazoo, Gunther S. Fonken, Charleston Township, Kalamazoo County, and John E. Pike, Kalamazoo, Mich., assignors to The Upjohn Company, Kalamazoo, Mich., a corporation of Delaware
No Drawing. Filed Feb. 19, 1964, Ser. No. 345,870
15 Claims. (Cl. 195—30)

This invention relates to a novel process for the microbiological conversion of unsaturated fatty acids and is more particularly concerned with a process for the microbiological conversion of unsaturated fatty acids to substituted cyclopentane derivatives having the prostaglandin-type structure as hereinafter defined.

The process of the invention, in its brodest aspect, comprises subjecting an unsaturated fatty acid having a 1,4-diene grouping in the hydrocarbon chain to the oxygenating activity of a species of Subphylum 2 of Phylum III and obtaining thereby a product having prostaglandin-like activity as hereinafter defined.

The term prostaglandin is used broadly to designate a material, having hypotensive and smooth muscle-stimulating activity, obtained from accessory genital glands, seminal fluid and the like. Thus, hypotensive activity was noted by Japelli and Scopa in 1906 (Arch. Ital. Biol. 45, 165) in an extract of dog prostrate glands. Hypotensive activity and smooth muscle stimulating activity were noted in extracts from comparable sources by Kurzrok in 1931 (Proc. Soc. Exp. Biol. N.Y. 28, 268), Goldblatt in 1933 (Chem. E. Ind. 52, 1056), and von Euler in 1931–6 [Arch. Exp. Path. Pharmak. 175, 78 (1934), 181 (1936), J. Physiol. 72, 74 (1931), 81, 102 (1934), 84, 21 (1935), 88, 213 (1936), Klin. Wschr, 14, 1182 (1935)]. A crude material, designated prostaglandin, having hypotensive activity and smooth muscle-stimulating activity was reported by von Euler.

Recently (Acta Chemica Scandinavia 14, 1693–1704, 1960) two distinct compounds designated PGE and PGF have been isolated from crude materials such as von Euler prostaglandin. The structure of these compounds has been shown to be as follows:

PGE (also termed $PGE_1$) has the following structure:

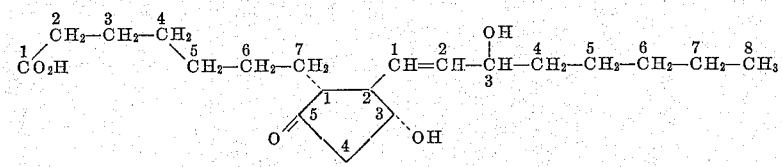

and is named systematically (using the numbering shown) as:

7-[3α-hydroxy-2-(3-hydroxy-1-octenyl) - 5 - oxocyclopentyl]-heptanoic acid.

PGF (also termed $PGF_{1\alpha}$) has the following structure:

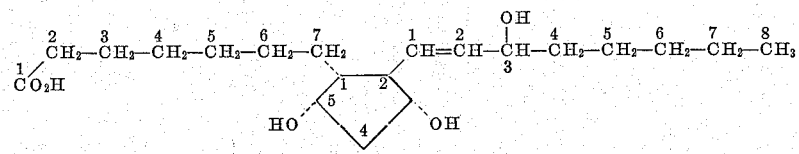

and is named systematically (using the numbering shown) as:

7-[3α,5α - dihydroxy - 2 - (3-hydroxy-1-octenyl)cyclopentyl]-heptanoic acid.

The dotted line attachments shown in the above formulae indicate that these substituents are in the α-configuration, i.e., are below the plane of the cyclopentane nucleus.

The PGE series of compounds is characterized by the presence of the keto group at the 5-position in the cyclopentane ring. The PGF series is characterized by the presence of the hydroxyl group at the 5-position in the cyclopentane ring. Various other members of the PGE and PGF series are known and are named either systematically or in turns of their relationship to PGE and PGF. Thus, reduction of PGE with sodium borohydride gives PGF and the β-epimer thereof in which the hydroxyl group at the 5- position in the cyclopentane ring is in the β-configuration. This β-epimer is known as epi-PGF or $PGF_{1\beta}$, the β-suffix indicating the configuration of the hydroxyl at the 5-position. The compound designated PGF above is also often designated as $PGF_{1\alpha}$ to show the configuration of the hydroxyl at the 5-position.

Each of the compounds PGE, PGF and epi-PGF on hydrogenation gives rise to the corresponding saturated acids, namely:

Dihydro PGE=7-[3α-hydroxy-2-(3 - hydroxyoctyl)-5-oxocyclopentyl]-heptanoic acid

Dihydro $PGF_{1\alpha}$=7-[3α,5α-dihydroxy - 2 - (3-hydroxyoctyl)cyclopentyl]-heptanoic acid Dihydro-epi-PGF (or dihydro $PGF_{1\beta}$)=7-[3α,5β-dihydroxy-2-(3-hydroxyoctyl)-cyclopentyl]-heptanoic acid All of these dihydro acids have the same activity which is typical of PGE and PGF.

Various dehydro derivatives of PGE and PGF are also known as follows, the numeral suffix in the names of these compounds indicating the number of double bonds in the molecule.

Bisdehydro-PGE ($PGE_2$)=7-[3α-hydroxy - 2 - (3-hydroxy-1-octenyl)-5-oxocyclopentyl]-5-heptenoic acid Tetradehydro - PGE ($PGE_3$)=7 - [3α - hydroxy-2-(3-hydroxy-1,5-octadienyl)-5-oxocyclopentyl]-5 - heptenoic acid Bisdehydro-PGF ($PGF_{2\alpha}$)=7-[3α,5α - dihydroxy-2-(3-hydroxy-1-octenyl)-cyclopentyl]-5-heptenoic acid Tetradehydro-PGF ($PGF_{3\alpha}$)=7 - [3α,5α-dihydroxy-2-(3-hydroxy-1,5-octadienyl)-cyclopentyl]-5-heptenoic acid Tetradehydroepi-PGF ($PGF_{3\beta}$)=7-[3α,5β - dihydroxy-2-(3-hydroxy - 1,5 - octadienyl)-cyclopentyl]-5-heptenoic acid All the acids set forth above, as well as the esters and salts thereof as hereinafter defined and exemplified, possess the hypotensive and smooth muscle-stimulating activity typical of the von Euler prostaglandin, which activity is referred to throughout this specification as prostaglandin-like activity.

It is an object of this invention to provide a process for the preparation of the above group of compounds as well as compounds closely related structurally thereto, all of which compounds exhibit prostaglandin-like activity. It is a further object of this invention to provide a method of cyclizing fatty acids having a 1,4-diene group to the corresponding cyclopentylalkanoic acids.

In accordance with the process of the invention an unsaturated fatty acid having a 1,4-diene group in the chain is subjected to the oxygenating activity of a species of Subphylum 2 of Phylum III. The substrate undergoes ring closure involving the carbons in the 1 and 5 positions in the 1,4-diene moiety together with oxygenation at the 2 and 4 positions in said moiety, which series of changes can be represented broadly as follows:

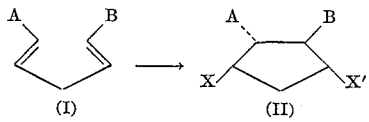

wherein A and B represent the residue of an unsaturated fatty acid and X and X' are selected from the group consisting of hydroxy and keto. The exact mechanism of the changes which take place in the process of the invention is not known. The following is offered as a possible mechanism which is depicted merely to assist in the understanding of the invention. The suggested mechanism does not in any way limit the scope and nature of this invention.

*Possible mechanism of process*

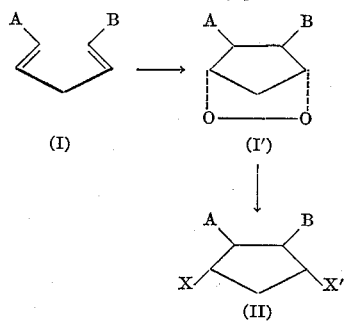

In the postulated mechanism shown above, the first step involves the conversion of the substrate (I) to the cyclized endoperoxide (I') which latter is then converted to the 3,5-dioxygenated product (II) in which A, B, X and X' are as hereinbefore defined.

In certain instances we have found that, in addition to the cyclization and 3,5-oxygenation described above, the substrate (I) when subjected to the process of the invention also undergoes oxygenation at one or more positions in the side chains A and/or B. Such side chain oxygenation generally occurs when the side chain in question contains an unsaturated linkage, particularly where said unsaturated linkage is separated by one methylene group from the 1,4-diene system of the substrate, i.e., where the chain of the fatty acid substrate contains one of the following partial structures:

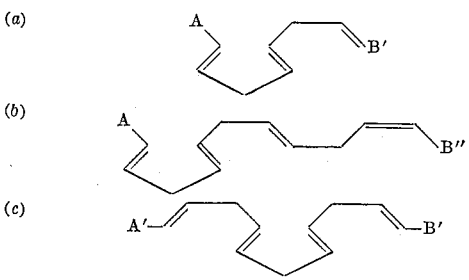

The side-chain oxygenation involves the carbon atoms of the unsaturated linkages in such compounds. For example, the main product obtained by subjecting the substrate (a) above to the process of the invention has the formula:

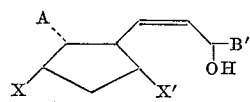

wherein X and X' have the significance defined above.

Similarly the products obtained by subjecting substrate (b) to the process of the invention are:

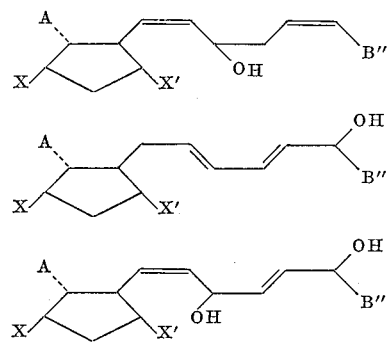

The products obtained by subjecting substrate (c) above to the process of the invention are:

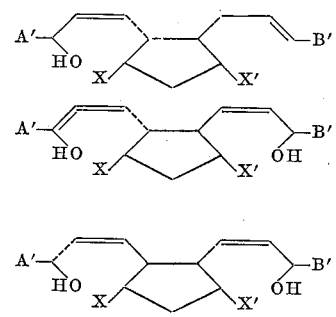

and

We have found that the side chain oxygenation occurs most readily when the double bonds in the side chain (the double bond or bonds separated by a methylene group from the 1,4-diene structure of the substrate) have the cis configuration, i.e., the hydrogen atoms attached to the carbon atoms of the double bond are in the cis position.

The process of the invention is carried out by subjecting the desired substrate to the oxygenating activity of a species of Subphylum 2 of Phylum III in a manner which will be described in detail hereafter.

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology, Sixth Edition, 1957, Saunders Company, Philadelphia at page 10. This aforesaid Subphylum 2 of Phylum III embraces five classes, namely Phycomycetes, Ascomycetes, Basidiomycetes, Deuteromycetes (Fungi imperfecti) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Endomycetales, Hysteriales, Sphaeriales, Agaricales, Nidulariales, Melanconiales, Moniliales, Mycelia Sterilia, Sphaeropsidales, Psuedomonadales and Actinomycetales. Among the families of the above listed orders, it is preferred to employ in the practice of this invention species of microorganisms falling within the families Mucoraceae, Cunninghamellaceae, Eurotiaceae, Saccharomycetaceae, Hysteriaceae, Nectreaceae, Clavicipitaceae, Melanconiaceae, Moniliaceae, Cryptococcaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenangium, Adelopus, Chaetomium, Endothia, Guignardia, Boletus, Alnicola, Deconica, Corticium, Cyathus, Ascochyta, Diplodia, Wojnowicia, Septomyxa, Torulopsis, Lipomyces, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

Table I

Phycomycetes:
    Entomophthorales.—Conidiobolus, Delacroixia
    Mucorales.—Absidia, Blakeslea, Circinella, Chaetocladium, Cunninghamella, Helicostylum, Gongronella, Mucor, Parasitella, Phycomyces, Rhizopus
    Saprolegniales.—Achlya Ascomycetes:
    Endomycetales.—Ascocybe, Byssochlamys, Cephaloascus, Endomyces, Endomycopsis, Petasospora
    Eurotiales.—Ctenomyces, Carpenteles, Eidamella, Emericillopis, Eurotium, Microascus, Penicilliopsis, Talaromyces
    Dothideales.—Acrospermum, Capnodium, Chaetothyrum, Cymadothea, Dangeardiella, Dothidea, Rhopographus, Scorias
    Helotiales.—Allophylaria, Cenangium, Corynella, Dermea, Godronia, Pezizella
    Hemisphaeriales.—Schizothyrina, Schizothyrium
    Hypocreales.—Calonectria, Calostilbe, Claviceps, Cordyceps, Creonectria, Epichloe, Gibberella, Hypocrea, Hypomyces, Loramyces, Melanospora, Nectria, Nectriella, Neocosmospora, Ophionectria, Sphaerostilbe
    Hysteriales.—Farlowiella, Gloniella, Gloniopsis, Glonium Hysterium, Lophium, Mytilidion, Ostreion
    Myriangiales.—Dothiora, Elsinoe
    Pezizales.—Ascobolus, Discomycetella, Morchella, Patella, Pyronema, Sowerbyella, Wolfina
    Phacidiales.—Coccopeziza, Colpoma, Clithris, Phacidiella, Phacidium, Sphaerothyrium
    Sphaeriaes.—Adelopus, Chaetomium, Chaetomidium, Clathrospora, Didymella, Endothia, Glomerella, Guignardia, Mycosphaerella, Physalospora, Xylaria, Subbaromyces
    Taphrinales.—Protomyces, Taphridium Taphrina Basidiomycetes:
    Agaricales.—Aleurodiscus, Alnicola, Boletus, Clavaria, Coprinus, Clitocybe, Collybia, Coniophora, Corticum, Deconica, Entaloma, Fomes, Hygrophorus, Lentinellus, Lentinus, Panaeolus, Paxillus, Peniophora, Pholiota, Pleurotus, Plicatura, Polyporus, Poria, Psalliota, Schizophyllum, Sparassis, Stereum, Tricholoma, Trametes
    Lycoperdales.—Bovista, Calvatia, Geastrum, Lycoperdon
    Nidulariales.—Crucibulum, Cyathus, Nidula, Sphaerobolus
    Phallales.—Mutinus, Phallus, Simblum
    Sclerodermatales.—Gastrosporium, Lycogalopsis, Phellorinia, Sphaerobolus, Tulostoma
    Tremellales.—Auricularia, Ceratobasidium, Calocera, Dacrymyces, Helicobasidium
    Ustilaginales.—Bryophytomyces, Cintractia, Entyloma, Farysia, Graphiola, Schizonella, Sorosporium, Tilletia, Tolyposporium, Urocystis, Ustilago Deuteromycetes:
    Melanconiales.—Actinonema, Allelchaeta, Colletotrichum, Cryptosporium, Entomosporium, Melanconium, Myxosporium, Pestalotia, Septomyxa, Steganosporium, Tuberculariella
    Moniliales.—Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Penicillium, Sepedonium, Sporotrichum, Trichothecium
    Mycelia Sterilia.—Microxyphium, Papulospora, Rhizoctonia, Sclerotium
    Sphaeropsidales.—Ascochyta, Coniothyrium, Dendrophoma, Diplodia, Diplodina, Polyopeus, Sphaeropsis, Wojnowicia, Zythia Schizomycetes:
    Actinomycetales.—Micrococcus, Mycobacterium, Mycococcus, Nocardia, Streptomyces
    Pseudomonadales.—Pseudomonas, Mycoplana, Protaminobacter
    Eubacteriales.—Aerobacter, Arthrobacter, Bacillus, Corynebacterium Cultures of a large number of species, falling within the group of microorganisms which can be employed in the process of the invention, are available from known sources such as the Northern Utilization Research and Development Branch, U.S. Department of Agriculture, Peoria, Illinois (NRRL), the American Type Culture Collection (ATCC), Washington, D.C., and Centraalbureau voor Schimmelcultures (CBS), Baarn, Holland or as otherwise indicated. The species listed in Table II, together with Culture Collection numbers, are typical of those which are available from the above sources and are representative of those which can be employed in the process of the invention.

Table II

Phycomycetes:
    Achlya americana, ATCC 10977
    Achlya bisexualis, ATCC 11397
    Achlya crenulata, ATCC 11315, CBS
    Absidia cylindrospora, ATCC 11516
    Absidia cylindrospora, NRRL 2796
    Absidia cylindrospora, var. rhizamorpha, NRRL 2815
    Absidia pseudocylindrospora, NRRL 2770
    Absidia glauca, ATCC 7852a, 7852b
    Circinella angarensis, NRRL 2410
    Circinella angarensis, NRRL 2628
    Circinella spinosa, ATCC 9025, CBS
    Cunninghamella blakesleeana, ATCC 8688a
    Cunninghamella baineri, ATCC 6794b
    Gongronella butleri, CBS
    Gongronella urceolifera, CBS
    Gongronella lacrispora, NRRL 2643
    Mucor griseocyanus, ATCC 1207a
    Rhizopus arrhizus, ATCC 11145
    Rhizopus nigricans, ATCC 6227b Ascomycetes:
    Adelopus nudus, CBS
    Cenangium abietis, CBS
    Dermea balsama, CBS
    Dermea libocedri, CBS
    Eurotium echinulatum, CBS
    Calonectria decora, CBS
    Clithris quercina, CBS
    Gibberella saubinettii, CBS
    Hypomyces haematococcus, CBS
    Chaetomium globosum, ATCC 6205
    Gloniopsis brevisaccata, CBS
    Glonium clavisporum, CBS
    Glonium stellatum, CBS
    Hysterium angustatum, CBS
    Hysterium insidens, CBS
    Lipomyces lipoferus, ATCC 10742
    Lipomyces starkeyi, ATCC 12659
    Mytilidion australe, CBS
    Mytilidion hastenii, CBS
    Mytilidion tortile, CBS
    Endothia parasitica, ATCC 9414
    Guignardia bidwelli, ATCC 9559, 9560

Basidiomycetes:
    Alnicola escharoides, CBS
    Boletus luteus, CBS
    Boletus sp, Peck 168 (Ohio State Univ.)

*Coprinus narcoticus*, CBS
*Corticium sasakkii*, NRRL 2705
*Corticium microsclerotia*, NRRL 2727
*Clavaria stricta*, CBS
*Deconica atrorufa*, CBS
*Deconica coprophila*, CBS
*Cyathus poeppigii*, CBS
*Cyathus olla*, CBS
*Pleurotus passeckerianus*, ATCC 9416
*Pholiota adiposa*, ATCC 9393
*Poria ambigua*, ATCC 9408
*Sphaerobolus stellatus*, CBS Deuteromycetes:
*Alternaria tenuis*, ATCC 6663
*Aspergillus nidulans*, ATCC 11267
*Aspergillus niger*, ATCC 9027
*Aspergillus niger*, ATCC 9142
*Aspergillus niger*, ATCC 10579
*Aspergillus niger*, ATCC 8740
*Aspergillus proliferans*, CBS
*Aspergillus ruber*, ATCC 9481
*Aspergillus versicolor*, ATCC 9577
*Brachysporium oryzae*, ATCC 11571, CBS
*Cladosporium resinae*, NRRL 2778
*Curvularia lunata*, ATCC 12017
*Curvularia pallescens*, ATCC 12017, NRRL 2381
*Cylindrium suaveolens*, CBS
*Cylindrocarpon didymum*, CBS
*Cylindrocarpon radicicola*,, ATCC 11811
*Fusarium culmorum*, ATCC 12656
*Helicodendron tubulosum*, CBS, ATCC 7808
*Helicosporium lumbricopsis*, CBS
*Helicosporium phragmitis*, CBS
*Helminthosporium carbonum*, ATCC 9627
*Keratinomyces ajelloi*, CBS
*Penicillium atrovenetum*, CBS
*Penicillium aurantio-virens*, ATCC 10413, NRRL 2138
*Penicillium patulum*, ATCC 9260, 10120, NRRL 994
*Rhizoctonia solani*, ATCC 6221, 10154, 10157, 10159, 10163, etc.
*Sepedonium ampullosporum*, CBS
*Sporotrichum sulfurescens*, ATCC 7159
*Torulopsis magnoliae*, CBS
*Torulopsis dattila*, ATCC 10691
*Torulopsis holmii*, ATCC 10670
*Trichothecium roseum*, ATCC 8685, NRRL 1665
*Ascochyta linicola*, NRRL 2923, CBS
*Diplodia natalensis*, ATCC 9055
*Septomyxa affinis*, ATCC 6737
*Wojnowicia graminis*, CBS
*Zythia resinae*, CBS Schizomycetes:
*Mycobacterium rhodochrous*, ATCC 999, 4273, 4276
*Micrococcus flavoroseus*, ATCC 397
*Micrococcus cerolyticus*, ATCC 12559
*Micrococcus cinnabareus*, ATCC 11890
*Micrococcus rubens*, ATCC 186
*Nocardia corallina*, CBS, ATCC 4273, 2161
*Nocardia erythropolis*, CBS, ATCC 4277
*Nocardia gardneri*, ATCC 9604
*Nocardia restrictus*, CBS
*Aerobacter aerogenes*, ATCC 8724
*Streptomyces roseochromogenus*, ATCC 3347
*Streptomyces argenteolus*, ATCC 11009
*Streptomyces olivaceus*, ATCC 12019
*Streptomyces mediocidicus*, ATCC 13279
*Streptomyces mediocidicus*, ATCC 13278
*Pseudomonas aeruginosa*, ATCC 8689
*Pseudomonas fluorescens*, ATCC 949
*Corynebacterium simplex*, ATCC 6946

The operational conditions employed in the process of this invention are advantageously those known in the art of bioconversion as illustrated in Murray et al., U.S. Patents 2,602,769 and 2,735,800. The bioconversion process of the invention can be effected using a growing or resting culture of a microorganism of the aforesaid Subphylum 2 or by using spores, washed cells or enzymes of the microorganism. Advantageously the process of the invention is carried out using a growing culture of said microorganism and a convenient procedure is as follows.

The microorganism is cultured in or on a suitable medium favorable to its growth. The culture medium contains sources of nitrogen and carbon essential to the growth of the microorganism. The growth of the microorganism will normally be carried out under aerobic conditions using an adequate sterile air supply by conventional techniques of exposing a large surface of the medium or by passing air through a submerged culture.

Nitrogen in assimilable form can be provided by sources normally employed in such processes, for example, as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as glucose, fructose, sucrose, lactose, maltose, dextrins, starches, meat extracts, peptones, amino acids, proteins, fatty acids, glycerol, whey and the like. These materials can be used either in a purified state or as concentrates such as when concentrate, corn steep liquor, grain mashes, and the like, or as mixtures of the above. Many of the above sources of carbon can also serve as a source of nitrogen.

The medium employed in the growth of the microorganism can desirably have a pH before inoculation of between about 4 to about 7 though a higher or lower pH can be employed in certain instances. A temperature of about 25 to 32° C. is preferred for growth of the microorganism but higher or lower temperatures within a relatively wide range can be employed.

The substrate is preferably added to the fermentation when the microorganism is in a period of rapid growth but it can also be added at any other period of the fermentation, or, if desired, before the medium is sterilized or inoculated provided that allowance is made for effects of initial pH and temperature upon the stability of the substrate. The addition of the substrate can be made as a single feed or the substrate can be added batchwise or continuously over an extended period of time.

The substrate can be added in the form of the free acid or an etser (e.g. lower-alkyl ester) thereof preferably in solution in a water-miscible solvent, or can be added as a salt such as the sodium, potassium, calcium and like salts, preferably as an aqueous solution thereof.

The amount of substrate added to a given fermentation varies according to the nature of the microorganism and the substrate used but is generally of the order of about 0.01 to about 10 grams per liter of fermentation medium.

The temperature at which the fermentation is maintained after addition of the substrate is advantageously that normally employed for the continued growth of the microorganism but it is only necessary that it be maintained within such a range, preferably 20 to 35° C., as supports life, active growth or enzyme activity of the microorganism. A pH of about 4 to 6 is generally preferred for growth of the microorganism during the bioconversion but for microorganisms of the class Schizomycetes, the pH should be about 7 during the fermentation.

The time required to effect the required bioconversion of the substrate varies considerably according to the nature of the substrate, microorganism, and the conditions employed. Generally speaking the time required for bioconversion can vary from about 2 to 120 hours but a time of 75 hours is generally sufficient. The progress of the bioconversion and its completion are conveniently determined by the use of analytical techniques such as paper-strip chromatography and thin-film chromatography [Heftman, Chromatography, 1961, Reinhold Publishing Company, New York, New York] coupled with microbiological assay techniques based on the smooth muscle stimulating activity and hypotensive activity of the desired products, for example, the assay based on rabbit-blood pressure measurements reported by Horton and Main, Brit. J. Pharmacol. 21, 182, 1963, or the in vitro assays of smooth muscle stimulating properties according to von Euler, Archiv fur Physiologie, 77, 96–99, 1937.

As an alternative to the use of a growing culture of the microorganism, the bioconversion of the substrate can be effected by subjecting the substrate to the action of (a) enzymes isolated from the microorganism, (b) spores of the microorganism, and (c) isolated cells of the microorganism. Isolated enzyme preparations can be prepared in accordance with the general procedure disclosed by Zuidweg et al., Biochim. Biophysics Acta, 58, 131, 1962. The use of spores of the microorganism in the bioconversion of the substrate is carried out using, for example, the procedure described in U.S. Patents 3,031,379 and 3,031,382. The preparation and use of washed cells of the microorganism is carried out, for example, according to the procedure described in U.S. Patent 2,831,789.

Whichever of the above methods of bioconversion is employed the products of the bioconversion are isolated from the resulting mixture using methods which are conventional in the art. For example, where the bioconversion is effected using a growing culture of the microorganisms, the whole fermentation beer remaining at the end of the bioconversion is adjusted to a low pH, conveniently between about 1.0 and 4.0, and the resulting whole beer is extracted with a water-immiscible organic solvent such as methylene chloride, chloroform, carbon tetrachloride, ethylene chloride, trichloroethylene, ether, amyl acetate, benzene, and the like.

Alternatively, the beer and mycelia can be separated by conventional methods such as centrifugation or filtration, and then separately extracted with suitable solvents. For example, the mycelia can be extracted with either water-miscible or water-immiscible solvents, or the mycelia can be merely washed with water in cases where little or no product is contained in the mycelium, and the wash water added to the beer filtrate. The beer, free of mycelia, can then be extracted with water-immiscible solvents such as those listed above. The extracts from the beer and mycelia are combined, dried over a suitable drying agent and then concentrated to obtain a mixture of bioconverted fatty acids.

The mixture of acids so obtained is then separated by conventional procedures such as chromatography, counter-current distribution and the like. Advantage is taken of hydrophilic and lipophilic solvents and aqueous buffer solutions to effect isolation and purification of the crude acids and advantage is taken of differences in polarity due to the added hydroxyl group in PGF types and the greater unsaturation in the bisdehydro- and the tetrahydro- PGE and bisdehydro- PGF types, e.g., bisdehydro- PGF>PGF> tetradehydro - PGE>bisdehydro - PGE> PGE. Thus by fractional liquid-liquid extraction techniques such as countercurrent distribution or partition chromatography, homogeneous or single entities can be isolated from the crude extracts.

A preferred process involves extracting the crude material containing the active components, separating the acid components from the extract by contact with a material having affinity for acids, for example, aqueous buffer solutions or anion exchange resins, fractionating the crude acids by multi-stages of reverse phase, partition chromatography in which the first stage is heavily loaded so that the physiologically active acids are separated as a group and the later stages are lightly loaded whereby the physiologically active acids are fractionated into separate components.

The extraction of the crude material from the bioconversion is advantageously carried out in two steps in which the crude material is first extracted with water-miscible alkanols, for example, methanol, ethanol, isopropanol, and the extracted material then transferred to a water-immiscible lipophilic solvent. This is accomplished by concentrating the alkanol to an essentially aqueous slurry and extracting the aqueous solution that is obtained with the water-immiscible lipophilic solvent. Suitable water-immiscible lipophilic solvents for this purpose include chlorinated hydrocarbons, for example, methylene chloride, chloroform, and ethylene dichloride; lower fatty acid esters, for example, ethyl acetate, and amyl acetate; the higher alkanols, for example, the water-immiscible butanols, the pentanols, the hexanols and the octanols; the water-immiscible lower alkanones, for example, methyl isobutyl ketone; ethers, for example, dimethyl ether, diethyl ether, methyl isobutyl ether; aromatic hydrocarbons, for example, benzene and toluene; and the like.

The crude extracts thus obtained are then treated to isolate the carboxylic acids. Generally pharmacologically undesirable fats, fatty acids, and other impurities contaminate these crude extracts. These contaminants are removed by one or more partitions between a lipophilic phase, such as the solutions in lipophilic solvents resulting from the extracting step, and buffered aqueous alkaline phases, for example aqueous solutions of phosphate, bicarbonate, and tris-(hydroxymethylamino)methane. Any aqueous solution buffered at about pH 8–9 can be used. The lipophilic stage is extracted with the buffered aqueous phase, the buffered aqueous phase is then acidified to a pH of about 3–4, and redistribution is effected into the same or different lipophilic solvent. By suitable selection of the buffer pH and the lipophilic solvent, effective partition coefficients are obtained. The partition between the buffer phase and the lipophilic phase can be effected by counter-current distribution if desired. With sufficient transfers, particularly with the less polar lipophilic solvents, for example, ether, and the lower pH, for example about pH 8, the PGE type acids concentrate more in the lipophilic phase while the PGF type acids concentrate in the buffer phase. It is not necessary and usually not desirable, however, to effect separation of the PGE and PGF types at this stage, but simply to extract all the active acid components into the final buffer phase then transfer them to a volatile solvent, for example, ether, from which the crude acids can be recovered by evaporation in vacuo.

The progress of the active materials from one fraction to another can be followed by quantitative in vitro assays of muscle stimulating properties according to von Euler, Archiv fur Physiologie 77, 96–99 (1937). The total fatty acid concentration can be followed by microtitration with dilute alkali and the PGE type acids (cyclopentanones) are readily followed and distinguished from the PGF type acids (cyclopentanols) by the characteristic carbonyl absorption in the infrared near 1730 cm.$^{-1}$ and by development of ultraviolet absorption near 280 m$\mu$ with alkali.

Alternatively, the active acids can be recovered from the crude extracts by adsorption on and elution from anion exchange resins. In this case the transfer to a water-immiscible solvent can advantageously be omitted; and the water-miscible alkanol extract loaded directly on the ion-exchange column. Suitable anion exchange resins are obtained by chloromethylating, by the procedure given on pages 88 and 97 of Kunin, Ion Exchange Resins, John Wiley and Sons, Inc., a polystyrene resin, cross-linked if desired with divinyl benzene, prepared by the procedure given on page 97 Kunin. Ion exchange resins of this type are marketed under the names of Dowex 1 and Dowex 2, Dowex 3, Dowex 21K, Ionac A-300, Amberlites IRA-400 and IRA-401, Amberlite JR-45, Duolite A-102, and Duolites A-2, A-4, A-6. The adsorbed acids can be eluted with solvents for the acids, for example, those solvents listed above, acidified to pH of 3–4 with hydrochloric acid or with ammonium chloride. Aqueous solutions of water-miscible alkanols and ammonium chloride, for example, a 50 percent solution of ammonium chloride in 70 percent aqueous methanol can be effectively used.

The crude acids recovered from the crude extracts by one or the other procedure are then fractionated by multistage, reverse phase, partition chromatography. If desired a transfer from a highly non-polar solvent, for example, petroleum ether or like hydrocarbon solvent, to a hydrophilic solvent, advantageously an aqueous solution of a water-miscible alkanol, can be interposed to effect separation of the more non-polar impurities. On extraction of the non-polar solvent solution with aqueous alcoholic solution, the more highly non-polar components stay in the non-polar solvent. In the multistage, reverse phase, partition chromatography, the column in the first stage is loaded heavily in order to effect a rough separation of the desired active acids from the more and less polar components. The later stages are charged with the active fraction from the preceding stage but with a substantially lower loading than used in the final stage so that more effective separation into the component acids is obtained. The loading in the first stage can range from about 50 to about 250 mg. of crude acid per gram of support whereas the loading in the later stages should be less than about 25 mg. of acid per gram of support. Suitable supports for the partition columns are hydrophobic diatomite (kieselguhr treated with chloromethylsilane) or finely divided, low-temperature polyethylene. The latter is advantageously used in the first stage. Any of the diatomaceous earths used as filter aids can be utilized by treating them with chloromethylsilane to render them hydrophobic. The high flow types, as exemplified by Hyflo Supercel, can be used advantageously. If desired the intermediate fractions can be treated to crystallize out the PGE before further fractionation. The stationary phase for the partition column is a lipophilic water-immiscible solvent and the mobile phase is a hydrophilic solvent. Thus, the hydrophobic support has affinity for the stationary phase but not for the mobile phase. Consequently, the more polar components are concentrated in the mobile phase and the less polar ones in the stationary phase. Any combination of lipophilic and hydrophilic phases can be used for this purpose. Their efficiency, however, will depend upon the partition coefficient. We have found that effective separation is obtained when the mobile phase is a solution of a water-miscible alkanol in water in about equal proportions, say between 3:5 to 5:3. Any immiscible lipophilic solvent can be used for the stationary phase but advantageously a mixture of relatively polar and non-polar solvents are employed, for example, a mixture of water-immiscible alkanols or alkanones or lower fatty acid esters with hydrocarbon or chlorinated hydrocarbon solvents. The two types of immiscible lipophilic solvents also should be in approximately equal proportions, say between 3:5 to 5:3. The mobile solvents and the stationary solvents are mixed and equilibrated to form the two phases. The stationary phase is then put on the column and the column is loaded with the charge, preferably dissolved or mixed with a small amount of one of the phases, preferably the mobile phase. The column is then eluted with the mobile phase.

By using a solvent system made up of a water-miscible alkanol and water in the proportions of 9:10 to 10:9 and a water-immiscible alkanol and chloroform in the proportions of 9:10 to 10:9 effective separation of the PGE type acids can be obtained in two stages of reverse phase, partition chromatography under the conditions of loading described above. On eluting the columns the progress of the components is followed by in vitro assays, microtitrations, paper chromatography or other assays and the desired fractions are pooled either for further processing or for recovery of the component fractionated.

Whilst the process of the invention can be employed as described above in the bioconversion of any fatty acid having a 1,4-diene grouping in the chain, it is of particular value in the bioconversion of certain fatty acids which can be represented by the following formula:

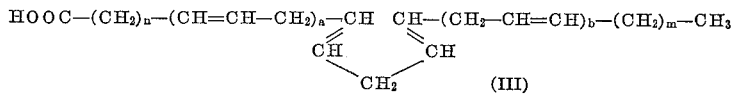

(III)

wherein $n$ is an integer from 1 to 8, inclusive, $a$ and $b$ are integers from 0 to 2, inclusive, and $m$ is an integer from 1 to 12, inclusive, provided that the sum of $3a+n$ is from 1 to 8, inclusive, and the sum of $3b+m$ is from 1 to 12, inclusive.

When subjected to the process of the invention as hereinbefore described, an acid of the Formula (III) is converted to a product or a mixture of products represented by the following formula:

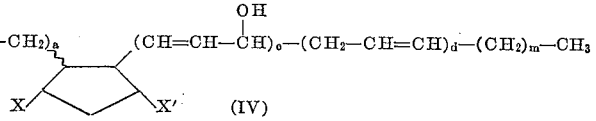

(IV)

wherein X and X' are selected from the class consisting of keto and α-hydroxy, $n$, $m$, and $a$ have the significance above defined, $c$ is an integer from 0 to 1, inclusive, and $d$ is an integer from 0 to 2, inclusive, provided that the sum of $3a+n$ is from 1 to 8, inclusive, and the sum of $3c+3d+m$ is from 1 to 12, inclusive. The wavy line attachment in the above Formula (IV) is inclusive of both the α- and β-configurations.

The identity of the end product (IV) obtained from the corresponding substrate (III) varies according to the nature of the substrate, the particular organism used and the reaction conditions employed. In general a mixture of products will be obtained in which the major components are the compounds of Formula (IV) corresponding to the particular substrate (III) employed but having the carboxylic acid side chain attached in the α-configuration, having X' as α-hydroxy, X as either α-hydroxy or keto, and $c=0$ or 1.

The products (IV) are compounds having prostaglandin-like activity as hereinbefore defined, i.e., they exhibit hypotensive and smooth-muscle stimulating activity. In particular, the major products obtained by submitting arachidonic acid (III; $a=1$, $n=3$, $b=1$, $m=4$) to the bioconversion process of the invention are found to be the prostaglandins $PGF_{1\alpha}$, $PGF_{2\alpha}$, $PGE_1$ and $PGE_2$. The hypotensive activity of the compounds (IV) makes them useful in the control of hypertension in man and valuable domestic animals and in laboratory animals such as mice, rats, and rabbits.

The compounds of Formula (IV) also possess activity as fertility-controlling agents, central nervous system regulatory agents, salt- and water-retention regulatory agents, and fat metabolic regulatory agents.

Illustrative of known fatty acids having the Formula III which can be employed as substrates in the bioconversion process of the invention are:

5,8,11,14-eicosatetraenoic acid (arachidonic acid)
5,8,11,14,17-eicosapentaenoic acid
8,11,14,17-eicosatetraenoic acid
5,8,11-ecisosatrienoic acid
8,11,14-eicosatrienoic acid
11,14-eicosadienoic acid
9,12-octadecadienoic acid (linoleic acid)
6,9,12-octadecatrienoic acid (linolenic acid)
11,14-actadecadienoic acid
9,12-hexadecadienoic acid
7,10,13-hexadecatrienoic acid On reaction of the acids (IV) with bases and carboxyl-esterifying agents the corresponding carboxylates (salts and esters) are obtained. Carboxylates exhibit the same activity as the free acids and can be used for the same purposes. Thus, the acids of the invention can be utilized in the free acid form or in the form of an ester or a pharmacologically acceptable salt, for example, a hydrocarbyl ester in which the hydrocarbyl group contains not more than 13 carbon atoms, or a salt of an alkali metal or alkaline earth base, for example, sodium, potassium, lithium, calcium, barium, strontium, and magnesium or of ammonia or a basic amine such as mono-, di-, and triethylamines, mono-, di- and tripropylamines (iso and normal), ethyldimethylamine, benzyldiethylamine, cyclohexylamine, benzylamine, dibenzylamine, N,N-dibenzylethylene diamine, N-methyl bis-ortho-methoxy-phenylisoproplyamine, methoxy-phenylisopropylamine, and like lower-aliphatic, lower-cycloaliphatic, and lower-araliphatic amines up to and including about eighteen carbon atoms; heterocyclic amines such as piperidine, morpholine, pyrrolidine, piperazine, and the loweralkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine; as well as amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris-(hydroxymethyl)aminomethane, phenylmonoethanolamine, p-tertiaryamylphenyldiethanol amine, and galactamine, N-methyl glucamine, N-methyl glocosamine, ephedrine, phenylephrine, epinephrine, and procaine, and can also be used in the form of their carboxylate esters for example the methyl, ethyl, 2-ethylhexyl, cyoclohexyl, cyclohexylmethyl, benzyl, benzhydryl, and like hydrocarbyl esters containing not more than 13 carbon atoms. These esters can be formed by the usual methods, for example, by reaction with diazomethane or other appropriate diazohydrocarbons.

The pharmacologically active acids (IV) in the form of the free acids or salts or carboxylate esters thereof produced by the process of the invention can be formulated and administered to birds and mammals, including man, rats, mice, rabbits, and valuable domestic animals in a wide variety of oral or parenteral dosage forms, singly, or in admixture with other active compounds. They can be associated with a pharmaceutical carrier which can be solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The following examples illustrate the best mode contemplated by the inventors for carrying out their invention but are not to be construed as limiting the scope thereof.

Example 1

Arachidonic acid was subjected to bioconversion by exposure to a growing culture of each of the species listed in Table III below.

*Media employed.*—For species of the classes Phycomycetes, Ascomycetes, Basidiomycetes and Deuteromycetes a medium of the following composition was employed:

Medium A:

| | | |
|---|---|---|
| Cornsteep liquor (60% solids) | g | 2 |
| Commercial dextrose | g | 1 |
| Lard oil | ml | 0.1 |
| Tap water | ml | 100 |

The medium was adjusted to pH 7 before sterilization.

For species of the class Schizomycetes a medium of the following composition was employed.

Medium B:

| | | |
|---|---|---|
| Commercial dextrose | g | 0.15 |
| Yeast extract | g | 0.15 |
| Peptone | g | 0.5 |
| Sodium chloride | g | 0.35 |
| Dipotassium phosphate | g | 0.36 |
| Tap water | ml | 100 |

The medium was adjusted to pH 7 before sterilization.

General procedure 100 ml. of the appropriate medium (as described above) in a 250 ml. shake flask was sterilized and inoculated with about 5 ml. of vegetative growth of the microorganism employed and the inoculated medium was incubated with shaking at a temperature of about 28° C.

After 24 to 48 hours, or when a moderate to heavy growth of mycelium was apparent, a solution of 10 mg. of arachidonic acid in 0.1 ml. of acetone was added and the incubation was continued for an additional 72-hour period.

At the end of this time the whole beer was acidified to about pH 2 by addition of concentrated sulfuric acid and the acidified whole beer was extracted with four separate portions of methylene chloride, each portion having a volume approximately one-fourth of that of the whole beer. The combined methylene chloride extracts were washed with one-fourth volume of distilled water and the solvent was removed by distillation. The residue was assayed using a combination of paper strip chromatography, biological assay for hypotensive activity carried out substantially as described by Horton et al., supra, and for smooth muscle stimulating properties carried out as described by von Euler, supra. The major products were found to be $PGF_{1a}$, $PGF_{2a}$, PGE, and $PGE_2$, the exact proportions of said products varying according to the organism employed.

The mixture so obtained was separated into its major components namely, $PGF_{1a}$, $PGF_{2a}$, PGE, and $PGE_2$ using the following procedure:

The residue was subjected to a five-stage countercurrent distribution between equal volumes of ether and 0.5 molar phosphate buffer at pH 6.4. The buffer phases were acidified and extracted three times with ether. All phases were evaporated to dryness, weighed, and the physilogical activity of each was determined using the assays described above. The samples which were found in this way to contain the bulk of the major components were each pooled and treated separately as follows.

Each sample was dissolved in the mobile phase of an isooctanol: chloroform: methanol: water (1:1:10:10) system at the rate of about 100 milligrams per 3 to 5 mls. of mobile phase. A column in which 4 ml. of static phase (upper phase) of an isooctanol: chloroform: methanol: water (1:1:10:10) system was supported on 4.5 g. of hydrophobic diatomite (kiesulguhr treated with chloromethylsilane) was charged with 100 milligrams of the pooled sample mixed with a minimum of about 3 to 5 ml. of mobile phase, and then developed with mobile phase. The eluate fractions from the column were assayed for smooth muscle activity using the test of von Euler, supra. Those fractions showing peak activities were evaporated. There were thus obtained the essentially pure components of the original mixture, i.e., $PGF_{1a}$, $PGF_{2a}$, PGE, and $PGE_2$.

*Table III*

*Achlya americana*, ATCC 10977
*Achlya bisexualis*, ATCC 11397
*Achlya crenulata*, ATCC 11315, CBS
*Absidia cylindrospora*, ATCC 11516
*Absidia cylindrospora*, NRRL 2796
*Absidia cylindrospora*, var. rhizamorpha, NRRL 2815
*Absidia pseudocylindrospora*, NRRL 2770
*Absidia glauca*, ATCC 7852a, 7852b
*Circinella spinosa*, ATCC 9025, CBS
*Cunninghamella blakesleeana*, ATCC 8688a
*Gongronella butleri*, CBS
*Mucor griseocyanus*, ATCC 1207a
*Rhizopus arrhizus*, ATCC 11145
*Rhizopus nigricans*, ATCC 6227b
*Calonectria decora*, CBS
*Gibberella saubinetti*, CBS
*Hypomyces haematococcus*, CBS
*Chaetomium globosum*, ATCC 6205
*Endothia parasiticus*, ATCC 9414
*Guignardia bidwellii*, ATCC 9559
*Corticium sasakii*, NRRL 2705
*Corticium microsclerotia*, NRRL 2727
*Deconica coprophila*, CBS
*Cyathus poeppigii*, CBS
*Cyathus olla*, CBS
*Sphaerobolus stellatus*, CBS
*Aspergillus nidulans*, ATCC 11267
*Aspergillus niger*, ATCC 9027
*Aspergillus niger*, ATCC 9142
*Aspergillus niger*, ATCC 10579
*Aspergillus niger*, ATCC 8740
*Aspergillus proliferans*, CBS
*Aspergillus ruber*, ATCC 9481
*Brachysporium oryzae*, ATCC 11571, CBS
*Cladosporium resinae*, NRRL 2778
*Torulopsis magnoliae*, CBS
*Curvularia lunata*, ATCC 12017
*Curvularia pallescens*, ATCC 12017, NRRL 2381
*Fusarium culmorum*, ATCC 12656
*Helicodendron tubulosum*, CBS
*Helicosporium lumbricopsis*, CBS
*Helicosporium phragmitis*, CBS
*Keratinomyces ajelloi*, CBS
*Lipomyces lipoferus*, ATCC 10742
*Penicillium atrovenetum*, CBS
*Penicillium aurantio-virens*, ATCC 10413, NRRL 2138
*Penicillium patulum*, NRRL 994
*Sepedonium ampullosporum*, CBS
*Septomyxa affinis*, ATCC 6737
*Sporotrichum sulfurescens*, ATCC 7159
*Trichothecium roseum*, ATCC 8685
*Ascochyta linicola*, NRRL 2923
*Diplodia natalensis*, ATCC 9055
*Wojnowicia graminis*, CBS
*Mycobacterium rhodochrous*, ATCC 4273
*Micrococcus flavoroseus*, ATCC 397
*Micrococcus cerolyticus*, ATCC 12559
*Micrococcus cinnabareus*, ATCC 11890
*Micrococcus rubens*, ATCC 186
*Nocardia corallina*, ATCC 4273
*Nocardia erythropolis*, ATCC 4277
*Nocardia gardneri*, ATCC 9604
*Pseudomonas aeruginosa*, ATCC 8689
*Pseudomonas fluorescens*, ATCC 949
*Corynebacterium sp.* ATCC 184
*Streptomyces rosechromogenus*, ATCC 3347
*Streptomyces argenteolus*, ATCC 11009
*Streptomyces olivaceus* ATCC 12019

*Example 2*

100 ml. of medium A (see Example 1) in a 250 ml. shake flask was sterilized and inoculated with about 5 ml. of a vegetative growth of *Torulopsis magnolia*, CBS and the inoculated medium was incubated with shaking at a temperature of about 28° C. When a moderately heavy growth of mycelium was apparent, a solution of 20 mg. of linolenic acid in 0.1 ml. of acetone was added and the incubation was continued for an additional 72 hr. period. At the end of this time the fermentation whole beer was acidified to about pH 2 by addition of concentrated sulfuric acid and the acidified whole beer was extracted with four separated portions of methylene chloride, each portion having a volume approximately one-fourth of that of the whole beer. The combined methylene chloride extracts were washed with one-fourth volume of distilled water and the solvent was removed by distillation. The residue was separated into its component parts by countercurrrent distribution followed by reversed phase partition chromatography using the procedures described in Example 1. There were thus obtained 5-[3α,5α-dihydroxy-2(3-hydroxy-1-octenyl)cyclopentyl]-pentanoic acid, 5-[3α-hydroxy-2-(3-hydroxy-1-octenyl)-5-oxocyclopentyl]-pentanoic acid, 8-[3α,5α-dihydroxy-2-(-hydroxy-1-pentenyl)-cyclopentyl] - octanoic acid and 8-[3α-hydroxy-2-(3-hydroxy-1-pentenyl) - 5-oxocyclopentyl]-octanoic acid.

The same compounds are obtained by using the above procedure but replacing the organism *Torulopsis magnolia* CBS by *Lipomyces lipoferus* ATCC 10742. Similarly, the above procedure can be repeated using, in place of *Torulopsis magnolia* CBS any of the species listed in Table III, above, to obtain the above four compounds in varying proportions.

*Example 3*

Using the procedure of Example 2, but replacing linolenic acid by linoleic acid, there was obtained a mixture containing as its major components:

8-[3α,5α-dihydroxy-2-pentylcyclopentyl]-octanoic acid, and

8-[3α,hydroxy-2-pentyl-5-oxocyclopentyl]-octanoic acid which mixture was separated into its component parts by countercurrent distribution followed by reversed phase partition chromatography using the procedures described in Example 1.

*Example 4*

Using the procedure of Example 2, but replacing linolenic acid by 5,8,11,14,17-eicosapentaenoic acid, there was obtained a mixture containing as its major components:

tetradehydro PGE ($PGE_3$), and tetradehydro PGF ($PGF_{3a}$).

This mixture was separated into its components by countercurrent distribution followed by reversed phase partition chromatography using the procedures described in Example 1.

Similarly, the above procedure can be repeated using as microorganism any of the species listed in Table III above, to obtain the above named compounds in varying proportions.

*Example 5*

Using the procedure of Example 2, but replacing linolenic acid by 8,11,14,17-eicosatetraenoic acid, there was obtained mixture containing as its major components:

7 - [3α - hydroxy-2-(3-hydroxy-1,5-octadienyl)-5-oxocyclopentyl]heptanoic acid,

7 - [3α,5α - dihydroxy - 2-(3-hydroxy-1,5-octadienyl)-cyclopentyl]heptanoic acid, 10 - [3α-hydroxy-2-(3-hydroxy-1-pentenyl)-5-oxocylopentyl]-8-decenoic acid, and 10 - [3α,5α - dihydroxy-2-(3-hydroxy-1-pentyl)-cyclopentyl]-8-decenoic acid.

This mixture was separated into its components by countercurrent distribution followed by reversed phase partition chromatography using the procedure described in Example 1.

Similarly, the above procedure can be repeated using as microorganism any of the species listed in Table III above to obtain the above-named compounds in varying proportions.

*Example 6*

Using the procedure of Example 2, but replacing linolenic acid by 5,8,11-eicosatrienoic acid, there was obtained a mixture containing as its major components:

7 - [3α-hydroxy-2-octyl-5-oxocyclopentyl]-5-heptenoic acid,

7-[3α,5α-dihydroxy-2-octylpentyl]-5-heptenoic acid,

4 - [3α - hydroxy - 2-(3-hydroxy-1-undecenyl)-5-oxocyclopentyl]-butanoic acid, and 4 - [3α,5α-dihydroxy-2-(3-hydroxy-1-undecenyl)-cyclopentyl]-butanoic acid.

This mixture was separated into its components by countercurrent distribution followed by reversed phase partition chromatography using the procedures described in Example 1.

Similarly, the above procedure can be repeated using as microorganism any of the species listed in Table III above, to obtain the above-named compounds in varying proportions.

*Example 7*

Using the procedure of Example 2, but replacing linolenic acid by 8,11,14-eicosatrienoic acid, there was obtained a mixture containing as its major components:

$PGE_1$, $PGF_{1\alpha}$,

10 - [3α - hydroxy-2-pentyl-5-oxocyclopentyl]-8-decenoic acid, and

10 - [3α,5α - dihydroxy-2-pentylcyclopentyl]-8-decenoic acid.

This mixture was separated into its components by countercurrent distribution followed by reversed phase partition chromatography using the procedures described in Example 1.

Similarly, the above procedure can be repeated using as microorganism any of the species listed in Table III above, to obtain the above-named compounds in varying proportions.

*Example 8*

Using the procedure of Example 2, but replacing linolenic acid by 11,14-eicosatrienoic acid, there was obtained a mixture containing as its major components:

10 - [3α - hydroxy-2-pentyl-5-oxocyclopentyl]decanoic acid, and

10 - [3α,5α-dihydroxy-2-pentylcyclopentyl]decanoic acid.

This mixture was separated into its components by countercurrent distribution followed by reversed phase partition chromatography using the procedures described in Example 1.

Similarly, the above procedure can be repeated using as microorganism any of the species listed in Table III above, to obtain the above-named compounds in varying proportions.

*Example 9*

Using the procedure of Example 2, but replacing linolenic acid by 11,14-octadecadienoic acid, there was obtained a mixture containing as its major components:

10 - [3α - hydroxy-2-propyl-5-oxocyclopentyl]decanoic acid, and

10 - [3α,5α - dihydroxy-2-propylcyclopentyl]decanoic acid.

This mixture was separated into its components by countercurrent distribution followed by reversed phase partition chromatography using the procedure described in Example 1.

Similarly, the above procedure can be repeated using as microorganism any of the species listed in Table III above, to obtain the above-named compounds in varying proportions.

*Example 10*

Using the procedure of Example 2, but replacing linolenic acid by 9,12-hexadecadienoic acid, there was obtained a mixture containing as its major components:

8 - [3α - hydroxy-2-propyl-5-oxocyclopentyl]-octanoic acid, and

8 - [3α,5α - dihyroxy - 2-propylcyclopentyl]-octanoic acid.

This mixture was separated into its components by countercurrent distribution followed by reversed phase partition chromatography using the procedures described in Example 1.

Similarly, the above procedure can be repeated using as microorganism any of the species listed in Table III above, to obtain the above-named compounds in varying proportions.

*Example 11*

Using the procedure of Example 2, but replacing linolenic acid by 7,10,13-hexadecatrienoic acid, there was obtain a mixture containing as its major components:

6 - [3α - hydroxy - 2-(3-hydroxy-1-pentenyl)-5-oxocyclopentyl]hexanoic acid,

6 - [3α,5α - dihydroxy-2-(3-hydroxy-1-pentenyl)-cyclopentyl]hexanoic acid,

9 - [3α - hydroxy-2-ethyl-5-oxocyclopentyl]-7-nonenoic acid, and

9 - [3α,5α - dihydroxy - 2-ethylcyclopentyl]-7-nonenoic acid.

This mixture was separated into its components by countercurrent distribution followed by reversed phase partition chromatography using the procedures described in Example 1.

Similarly, the above procedure can be repeated using as microorganism any of the species listed in Table III above, to obtain the above-named compounds in varying proportions.

*Example 12.—Methyl 5-[3α,5α-dihydroxy-2-(3-hydroxy-1-octenyl)cyclopentyl]pentanoate*

To a dry ether solution of ten milligrams of 5-[3α,5α-dihydroxy - 2-(3-hydroxy-1-octenyl)cyclopentyl]pentanoic acid was added a slight excess of diazomethane, prepared in ether from four micromoles of nitrosomethylurethane. The reaction mixture was allowed to stand for about 5 minutes and the ether and excess diazomethane were distilled off. On distillation to dryness there was obtained methyl 5-[3α,5α-dihydroxy-2-(3-hydroxy-1-octenyl)cyclopentyl]pentanoate.

Similarly, using the above procedure but replacing 5-[3α,5α - dihydroxy - 2-(3-hydroxy-1-octenyl)cyclopentyl] pentanoic acid by any of the other acids prepared as described in Examples 1 through 11, there are obtained the corresponding methyl esters.

In like manner, using the above procedure but replacing diazomethane by other diazoalkanes such as diazoethane, 1-diazo-2-ethylhexane, cyclohexyldiazomethane, phenyldiazomethane, diphenyldiazomethane and the like, there can be obtained the ethyl, 2-ethylhexyl, cyclohexylmethyl, benzyl, benzhydryl and like esters of 5-[3α,5α-dihydroxy - 2-(3-hydroxy-1-octenyl)cyclopentyl]pentanoic acid or any of the other acids described in Examples 1 through 11 hereinabove. Other methods can also be used for preparing the same and like esters. For example, the silver salts of the acids prepared as described in Examples 1 to 11 can be reacted with the appropriate iodide, for example, methyl, ethyl, 2-ethylhexyl, cyclohexylmethyl, benzyl, or benzhydryl iodide.

*Example 13.—Sodium 5-[3α-5α-dihydroxy-2-(3-hydroxy-1-octenyl)cyclopentyl]pentanoate*

A suspension of 10 milligrams of 5-[3α,5α-dihydroxy-2(3-hydroxy-1-octenyl)cyclopentyl]pentanoic acid in 10 mls. of water was shaken with 1 equivalent of a solution of sodium hydroxide in water until no insoluble matter remained. The resulting solution was evaporated to dryness under reduced pressure to yield sodium 5-[3α,5α-dihydroxy - 2-(3-hydroxy-1-octenyl)cyclopentyl]pentanoate in the form of a solid.

Similarly using the above procedure but replacing sodium hydroxide by potassium hydroxide, lithium hydroxide, ammonium hydroxide, ethylamine and the like there are obtained the corresponding salts of 5[3α,5α-dihydroxy-2-(3-hydroxy-1-octenyl)cyclopentyl]pentanoic acid.

Similarly, using the above procedure and neutralizing any of the acids set forth in Examples 1 to 11 with the appropriate inorganic or organic base there are obtained the corresponding salts.

We claim:

1. A process for the preparation of a compound having the formula:

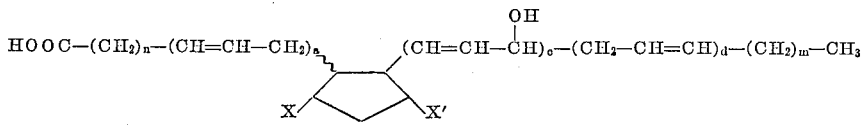

wherein X and X' are selected from the class consisting of keto and α-hydroxy, $n$ is an integer from 1 to 8, inclusive, $a$ and $d$ are integers from 0 to 2, inclusive, $c$ is an integer from 0 to 1, inclusive, and $m$ is an integer from 1 to 12 inclusive, provided that the sum of $3a+n$ is from 1 to 8, inclusive, and the sum of $3c+3d+m$ is from 1 to 12, inclusive, which comprises subjecting an unsaturated fatty acid having the formula:

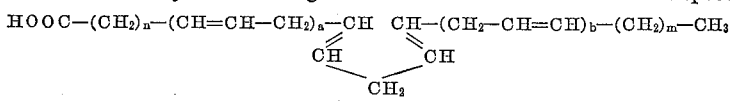

wherein $n$, $m$ and $a$ are as hereinbefore defined, and $b$ is an integer from 0 to 2, inclusive, provided that the sum of $3b+m$ is from 1 to 12, inclusive, to the oxygenating activity of a species of Subphylum 2 of Phylum III, and isolating said compound.

2. The process of claim 1 wherein the microorganism is a species of an order selected from the group consisting of Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonales, and Actinomycetales.

3. The process of claim 1 wherein the microorganism is a species of a family selected from the group consisting of Mucoraceae, Cunninghamellaceae, Eurotiaceae, Hyperiaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae.

4. The process of claim 1 wherein the microorganism is a species of a genus selected from the group consisting of Absidia, Circinella, Gongronella, Rhizopus, Cunninghamella, Eurotium, Gloniopsis, Glonium, Hysterium, Mytilidion, Calconectria, Gibberella, Hypomyces, Dermea, Cenangium, Adelopus, Chaetomium, Eudothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpum, Rhizoctonia, Pseudomonas, Mycobacterium, Micrococcus, Nocardia, and Streptomyces.

5. The process which comprises subjecting arachidonic acid to the oxygenating activity of a species of Subphylum 2 of Phylum III under submerged aerobic fermentation conditions and isolating the resulting product having prostaglandin-like activity.

6. The process which comprises subjecting arachidonic acid to the oxygenating activity of a species of Subphlyum 2 of Phylum III under submerged aerobic fermenation conditions and isolating the resulting mixture of prostaglandins.

7. The process which comprises subjecting arachiondic acid to the oxygenating activity of a species of Subphlyum 2 of Phylum III under submerged aerobic conditions, and isolating the resulting mixture of $PGF_{1a}$, $PGF_{2a}$, $PGE_1$ and $PGE_2$.

8. The process of claim 7 wherein the microorganism is a species of an order selected from the group consisting of Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonales, and Actinomycetales.

9. The process of claim 7 wherein the microorganism is a species of a family selected from the group consisting of Mucoraceae, Cunninghamellaceae, Eurotiaceae, Hyperiaceae, Nectraeceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae.

10. The process of claim 7 wherein the microorganism is a species of a genus selected from the group consisting of Absidia, Circinella, Gongronella, Rhizopus, Cunninghamella, Eurotium, Gloniopsis, Glonium, Hysterium, Mytilidion, Calconectria, Gibberella, Hypomyces, Dermea, Cenangium, Adelopus, Chaetomium, Eudothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichium, Trichothecium, Brachysporium, Cladosporium, Curvalaria, Cylindrocarpum, Rhizoctonia, Pseudomonas, Mycobacterium, Micrococcus, Nocardia, and Streptomyces.

11. The process which comprises subjecting arachidonic acid to the oxygenating activity of a species of Subphylum 2 of Phylum III under submerged aerobic conditions, isolating the resulting mixture of $PGF_{1a}$, $PGF_{2a}$, $PGE_1$, and $PGE_2$, and separating the mixture into its components.

12. The process which comprises subjecting an unsaturated fatty acid having the formula:

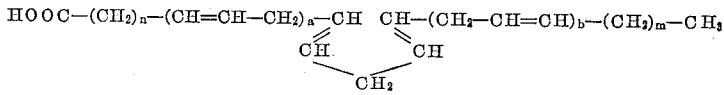

wherein $n$ is an integer from 1 to 8, inclusive, $a$ and $b$ are integers from 0 to 2, inclusive, and $m$ is an integer from 1 to 12, inclusive, provided that the sum of $3a+n$ is from 1 to 8, inclusive, and the sum of $3b+m$ is from 1 to 12, inclusive, to the oxygenating activity of a species of Subphylum 2 of Phylum III until a significant amount of product having prostaglandin-like activity is produced, and recovering said product.

13. The process of claim 12 wherein the microorganism is a species of an order selected from the group consisting of Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonales, and Actinomycetales.

14. The process of claim 12 wherein the microorganism is a species of a family selected from the group consisting of Mucoraceae, Cunninghamellaceae, Eurotiaceae, Hyperiaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae.

15. The process of claim 12 wherein the microorganism is a species of a genus selected from the group consisting of Absidia, Circinella, Gongronella, Rhizopus, Cunninghamella, Eurotium, Gloniopsis, Glonium, Hysterium, Mytilidion, Calonectria, Gibberella, Hypomyces, Dermea, Cenangium, Adelopus, Chaetomium, Eudothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichium, Trichothecium, Brachysporium, Cladosporium, Curvularia, Cylindrocarpum, Rhizoctonia, Pseudomonas, Mycobacterium, Micrococcus, Nocardia, and Streptomyces.

References Cited by the Examiner

UNITED STATES PATENTS 2,890,989   6/1959   Anderson _____ 195—78

A. LOUIS MONACELL, *Primary Examiner.*

L. M. SHAPIRO, *Assistant Examiner.*